United States Patent
Abesingha et al.

(10) Patent No.: US 12,095,351 B2
(45) Date of Patent: Sep. 17, 2024

(54) POWER CONVERTER WITH ADAPTATIVE STAGES AND GATE DRIVER

(71) Applicant: Murata Manufacturing Co., Ltd., Kyoto (JP)

(72) Inventors: Buddhika Abesingha, Escondido, CA (US); Arezu Bagheri, San Diego, CA (US); Gregory Szczeszynski, Hollis, NH (US)

(73) Assignee: Murata Manufacturing Co., Ltd., Kyoto (JP)

( * ) Notice: Subject to any disclaimer, the term of this patent is extended or adjusted under 35 U.S.C. 154(b) by 248 days.

(21) Appl. No.: 17/555,754

(22) Filed: Dec. 20, 2021

(65) Prior Publication Data

US 2023/0198376 A1    Jun. 22, 2023

(51) Int. Cl.
*H02M 3/158* (2006.01)
*H02M 1/00* (2006.01)
*H02M 1/088* (2006.01)

(52) U.S. Cl.
CPC ......... *H02M 1/088* (2013.01); *H02M 1/0006* (2021.05); *H02M 1/0009* (2021.05); *H02M 1/0032* (2021.05); *H02M 3/158* (2013.01)

(58) Field of Classification Search
CPC ... H02M 3/158; H02M 1/0006; H02M 1/0032
See application file for complete search history.

(56) References Cited

U.S. PATENT DOCUMENTS

| | | | |
|---|---|---|---|
| 10,778,101 B1* | 9/2020 | Schmitz ............. | H02M 3/1584 |
| 11,057,023 B1 | 7/2021 | Abesingha | |
| 2003/0038615 A1* | 2/2003 | Elbanhawy ........ | H03K 17/6871 323/282 |

(Continued)

OTHER PUBLICATIONS

Routledge, Antony, "Dynamic Division Ratio Charge Pump Switching", application filed in the USPTO on May 26, 2021, U.S. Appl. No. 17/331,594, 38 pgs.

(Continued)

*Primary Examiner* — Alex Torres-Rivera
(74) *Attorney, Agent, or Firm* — JAQUEZ LAND GREENHAUS & MCFARLAND LLP; John Land, Esq.

(57) ABSTRACT

A switching power converter architecture that is efficient across its entire power range, regardless of load level, by partitioning the power devices into segments for optimal gate drive and providing a local variable-voltage driver for each power device segment. Power device segments may be selectively enabled or disabled based on the level of power to be delivered to a load. In addition, an adaptive gate drive scheme enables dynamic control of the $R_{ON}$ and $Q_G$ values for each power converter device so that the power devices may operate at the lowest $R_{ON}$ value at or near maximum power levels for reduced conduction losses, at the lowest $R_{ON} \times Q_G$ product value at mid-level loads for peak efficiency, and at the lowest $Q_G$ value at light loads for reduced switching losses.

16 Claims, 8 Drawing Sheets

(56) References Cited

U.S. PATENT DOCUMENTS

| | | | |
|---|---|---|---|
| 2008/0290848 A1* | 11/2008 | Nguyen | H02M 3/156 |
| | | | 323/282 |
| 2019/0393786 A1* | 12/2019 | Chang | H02M 3/1584 |
| 2020/0395854 A1* | 12/2020 | Yao | H02M 3/1584 |
| 2021/0083572 A1* | 3/2021 | Yen | H02J 7/06 |
| 2022/0001817 A1* | 1/2022 | Sakamoto | B60R 16/033 |
| 2023/0155508 A1* | 5/2023 | Deboy | H02M 3/07 |
| | | | 323/271 |

OTHER PUBLICATIONS

Wu, Gary, "Efficient Bootstrap Supply Generations for Multi-Level Power Converters", provisional application filed in the USPTO on Jun. 24, 2021, U.S. Appl. No. 63/214,450, 64 pgs.

Zhang, et al., "Switch Mode Power Supply Corrent Sensing—Part 3: Current Sensing Methods", Analog Devices, Technical Article, 2018, 4 pgs.

* cited by examiner

POWER CONVERTER WITH ADAPTATIVE STAGES AND GATE DRIVER

BACKGROUND

(1) Technical Field

This invention relates to electronic circuits, and more particularly to power converter circuits, including DC-DC power converter circuits.

(2) Background

Many electronics in various applications (including but not limited to mobile computing, high-performance computing, communications, automotive, and industrial) require multiple voltage levels. For example, in many high-performance computing applications, a 12V standard power supply provides power to the electronic system, whereas microprocessors and FPGAs within those systems may require a low voltage level (e.g., 1-2V), while still other circuitry may require an intermediate voltage level (e.g., 5-10V).

Power converters are often used to generate a lower or higher voltage from a common power source, such as a battery. Power converters include DC-DC or AC-DC converters. One type of power converter comprises a converter circuit, control circuitry, and auxiliary circuitry such as bias voltage generator(s), a clock generator, a voltage regulator, a voltage control circuit, etc. Power converters which generate a lower output voltage level from a higher input voltage power source are commonly known as buck converters, so-called because $V_{OUT}$ is less than $V_{IN}$, and hence the converter is "bucking" the input voltage. Power converters which generate a higher output voltage level from a lower input voltage power source are commonly known as boost converters, because $V_{OUT}$ is greater than $V_{IN}$. Some power converters may be either a buck converter, a boost converter, or a buck-boost converter. Some power converters may provide an inverted output.

Figure 1:
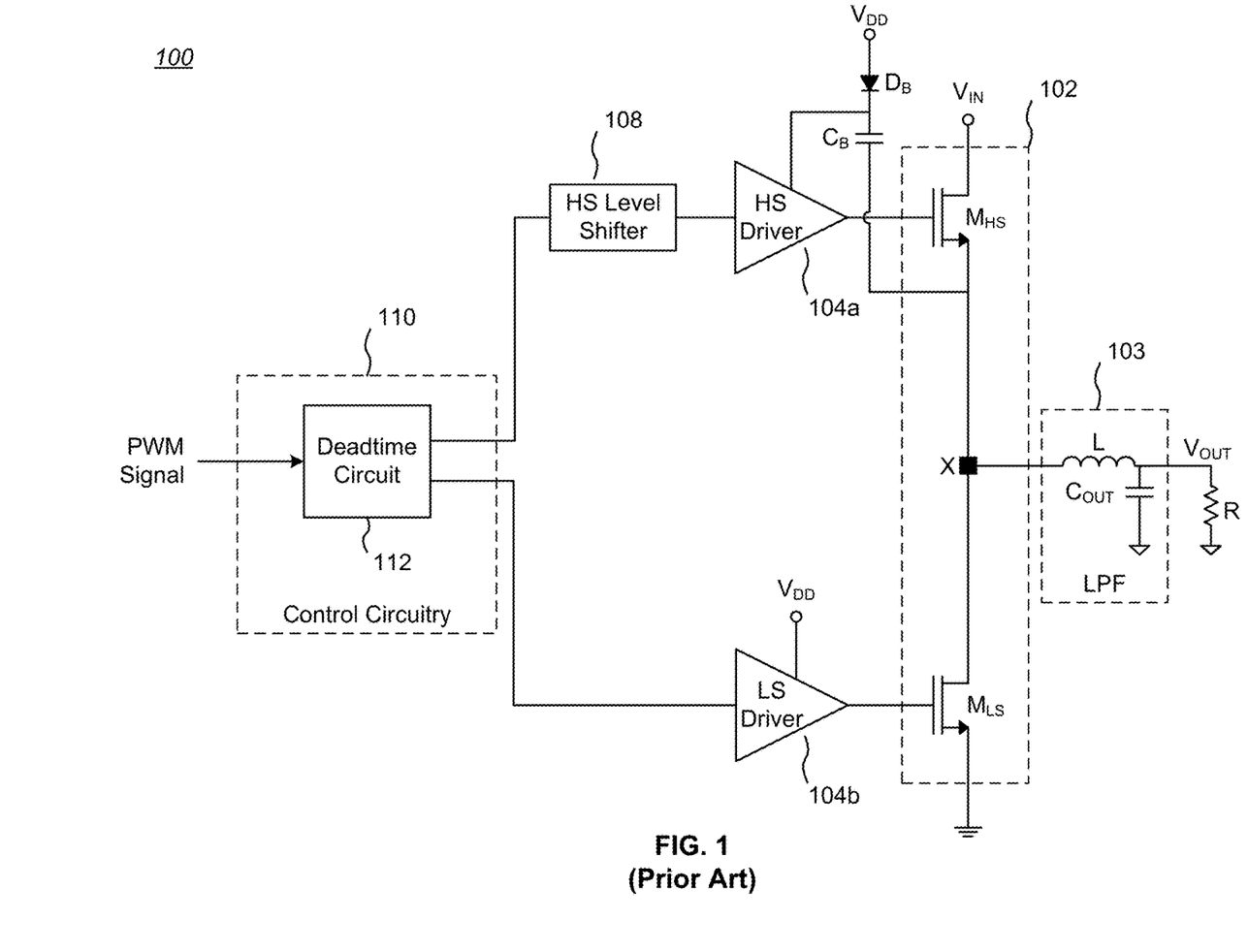
FIG. 1 is a block diagram of one example of a prior art buck power converter.

FIG. 1 is a block diagram of one example of a prior art buck power converter 100. A half-bridge power stage 102 comprises a "high side" power device (e.g., a MOSFET) $M_{HS}$ and "low side" power device $M_{LS}$. The half bridge power stage 102 is coupled to an output low-pass filter (LPF) 103 that includes, in this example, an inductor L and an output capacitor $C_{OUT}$.

A voltage $V_{IN}$ applied to $M_{HS}$ is converted by the half-bridge power stage 102 and the output LPF 103 in known fashion to a lower output voltage $V_{OUT}$ that may be applied to a coupled load (represented as a resistor R in this example). The control inputs (e.g., FET gates) of both power devices $M_{HS}$, $M_{LS}$ are driven by respective high-side and low-side drivers 104a, 104b. The high-side driver 104a may be powered by a bootstrap circuit, comprising a bootstrap capacitor $C_B$ series coupled to a bootstrap diode dB. The bootstrap circuit couples one terminal of the bootstrap capacitor $C_B$ to the system power supply $V_{DD}$, while the other terminal of the bootstrap capacitor $C_B$ is coupled to the output of the $M_{HS}$ power device. The low-side driver 104b may be powered by the system power supply $V_{DD}$. The input to the high-side driver 104a is from a level shifter 108 which converts a logic level input signal (e.g., 0V=binary 0, 5V=binary 1) to a shifted range of voltages suitable for the voltage conditions of the driver 104a (the high side driver 104a is referenced to a varying voltage present at node X).

The control circuitry 110 provides control signals to the respective inputs of the high-side driver 104a (through the level shifter 108) and the low-side driver 104b that regulate the ON-OFF duty cycle of the power devices $M_{HS}$, $M_{LS}$. In the illustrated example, the control circuitry 110 receives a pulse-width modulation (PWM) signal responsive to the power requirements to the load (which may vary with time). The PWM signal in this example includes at least a conventional deadtime circuit 112. The deadtime circuit 112 outputs essentially complementary versions of the PWM signal to the power devices $M_{HS}$, $M_{LS}$, with a slight modification to the respective PWM signals to insure a deadtime between when both power devices $M_{HS}$, $M_{LS}$ are turned ON, in order to avoid "shoot-through" from $V_{IN}$ to ground.

In some applications, such as high-performance computing, not only is voltage conversion needed, but high power conduction (e.g., 30-40 amps) is required as well. High power conduction conventionally requires large power devices in the half-bridge power stage 102. This large sizing degrades the efficiency of the power converter when conveying low power (e.g., 1-2 amps), such as in a standby mode of operation or other light load, since in these conditions the switching losses of the power devices dominate the power losses. Thus, large power devices trade off low conduction power losses for higher switching power losses.

There is a need for a power converter architecture that is efficient across its entire power range regardless of load level. The present invention meets this need.

SUMMARY

The present invention encompasses a switching power converter architecture that is efficient across its entire power range, regardless of load level, by partitioning the power devices into segments for optimal gate drive and providing a local variable-voltage driver for each power device segment. Power device segments may be selectively enabled or disabled based on the level of power to be delivered to a load. By dynamically configuring the power converter architecture size based on power delivery requirements, the power converter can be optimized for efficiency across the power range deliverable to the load.

In addition, an adaptive gate drive scheme enables dynamic control of the gate drive voltage for each power device so that the power devices may operate at the lowest ON resistance $R_{ON}$ value at or near maximum power levels for reduced conduction losses, at the lowest $R_{ON} \times Q_G$ value at mid-level loads for peak efficiency (where $Q_G$ is the total gate charge required to turn ON a power device to achieve the required $R_{ON}$), and at the lowest $Q_G$ value at light loads for reduced switching losses.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses a switching power converter architecture that is efficient across its entire power range, regardless of load level, by partitioning the power devices into segments for optimal gate drive and providing a local variable-voltage driver for each power device segment. Power device segments may be selectively enabled or disabled based on the level of power to be delivered to a load. By dynamically configuring the power converter architecture size based on power delivery requirements, the power converter can be optimized for efficiency across the power range deliverable to the load.

In addition, an adaptive gate drive scheme enables dynamic control of the gate drive voltage of each power device so that efficiency can be optimized for the full power range. At or near maximum load conditions, the gate drive voltage is chosen for the power devices to operate at the lowest ON resistance, $R_{ON}$, for reduced conduction losses. At mid-level load conditions, the gate drive voltage is chosen for the power devices to operate at their lowest $R_{ON}$ and $Q_G$ multiplier value (i.e., $R_{ON} \times Q_G$), where $Q_G$ is the total gate charge required to turn ON the power device to achieve the required $R_{ON}$, so as to achieve peak efficiency at mid-level loads. At or near light load conditions, the gate drive voltage is chosen for the power devices to reduce $Q_G$ so as to reduce switching losses which dominate the total power loss at light load conditions. A person skilled in the art will readily understand the benefit of optimizing efficiency by operating a power device in a condition that may achieve lowest possible $R_{ON}$ and $Q_G$ multiplier, or lowest $R_{ON}$, or lowest $Q_G$ for that power device depending on load requirements.

Power Device Segments

Figure 2A:
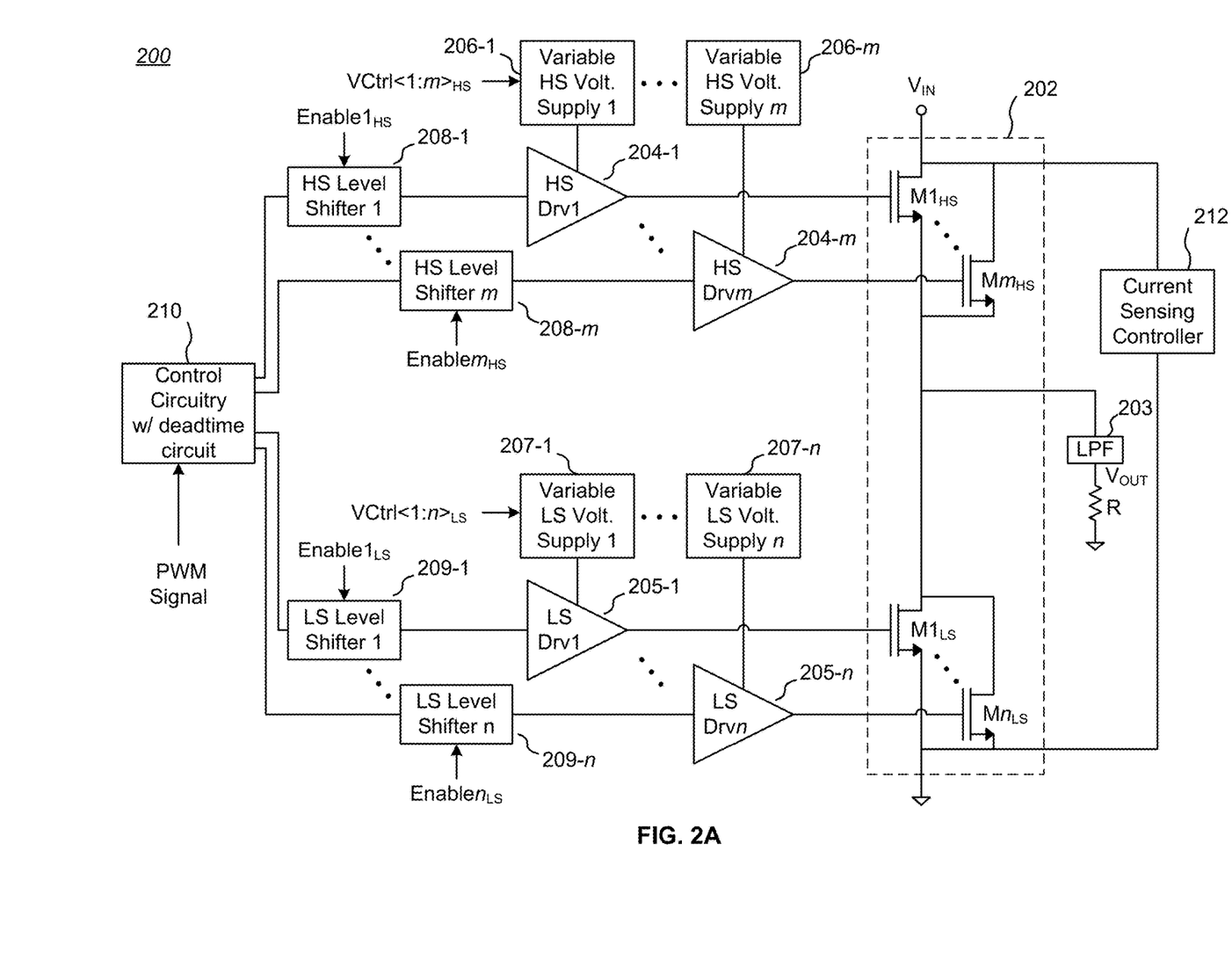
FIG. 2A is a block diagram of a first example of a buck power converter with power device segmentation and adaptive gate drive.

FIG. 2A is a block diagram of a first example of a buck power converter 200 with power device segmentation and adaptive gate drive. A half-bridge power stage 202 comprises multiple parallel "high side" power devices (e.g., MOSFETs) $M1_{HS} \ldots Mm_{HS}$, and multiple parallel "low side" power devices $M1_{LS} \ldots Mn_{LS}$, coupled to an output LPF 203, where $m+n \geq 3$; in many embodiments, $n > m$. A voltage $V_{IN}$ applied to one or more of the high side power devices $M1_{HS} \ldots Mm_{HS}$ is converted by the half-bridge power stage 202 and output LPF 203 to a lower output voltage $V_{OUT}$ that may be applied to a coupled load (represented as a resistor R in this example). In alternative boost embodiments, $V_{OUT}$ would be a higher voltage than $V_{IN}$, and in buck-boost embodiments, $V_{OUT}$ may be a lower or higher voltage than $V_{IN}$.

The output LPF 203 may be similar to the LC output LPF 103 shown in FIG. 1. Note that the output LPF 203 may be external (e.g., off-chip) with respect to an integrated circuit implementation of the other circuitry shown in FIG. 2A. In addition, other capacitors and/or inductors that in some embodiments may be coupled to the circuitry shown in FIG. 2A may also be located off-chip. Note also that other circuits, including feedback control circuitry, may be coupled to the circuitry shown in FIG. 2A to provide a complete power converter.

The gates of the power devices $M1_{HS} \ldots Mm_{HS}$ and $M1_{LS} \ldots Mn_{LS}$ are driven by respective high-side drivers 204-1 ... 204-m and low-side drivers 205-1 ... 205-n. Power to the drivers 204-1 ... 204-m and 205-1 ... 205-n is supplied by respective high-side variable voltage supplies 206-1 ... 206-m and high-side variable voltage supplies 207-1 ... 207-n, as described in greater detail below. In some embodiments, a single high-side variable voltage supply may be used to power all of the high-side drivers 204-1 ... 204-m, and a single low-side variable voltage supply may be used to power all of the low-side drivers 205-1 ... 205-n. In some embodiments, all of the drivers 204-1 ... 204-m and 205-1 ... 205-n may be supplied by a single variable voltage supply.

In the illustrated example, the input to the drivers 204-1 ... 204-m and 205-1 ... 205-n are from respective high-side level shifters 208-1 ... 208-m and low-side level shifters 209-1 ... 209-n which convert a logic level input signal to a shifted range of voltages suitable for the voltage conditions of the respective drivers 204-1 ... 204-m and 205-1 ... 205-n. While the low-side level shifters 209-1 ... 209-n may not be strictly necessary for voltage shifting, they do provide a signal propagation delay that essentially matches the signal propagation delay of the high-side level shifters 208-1 ... 208-m, as well as providing some signal isolation to the associated drives 205-1 ... 205-n. Propagation delay mismatches between the high-side and low-side signal paths usually leads to more variation in deadtime across PVT ranges. Accordingly, more closely matching signal propagation delays in the high-side and low-side signal paths helps reduce the amount of deadtime needed (see further discussion below regarding managing deadtime). However, in alternative embodiments, other circuits may be used in place of the low-side level shifters 209-1 ... 209-n to provide matching signal propagation delay and/or isolation. In some embodiments, the low-side level shifters 209-1 ... 209-n may be omitted.

Control circuitry 210 provides a set of time-varying PWM control signals to the level shifters 208-1 ... 208-m and 209-1 ... 209-n that regulate the ON-OFF duty cycle of the power devices $M1_{HS} \ldots Mm_{HS}$ and $M1_{LS} \ldots Mn_{LS}$. The control circuitry 210 may be similar to the control circuitry 110 of FIG. 1, including a deadtime circuit 112, but with additional control lines for the added circuit elements in FIG. 2A.

In the illustrated example, coupled to the control circuitry 210 is an optional power FET ON/OFF detector circuit 211. As noted above, the control circuitry 210 may include a deadtime circuit 112 that outputs essentially complementary versions of the PWM signal to the power devices $M1_{HS} \ldots Mm_{HS}$ and $M1_{LS} \ldots Mn_{LS}$ with a slight modification to the respective PWM signals to insure a deadtime between when the power devices are turned ON, in order to avoid "shoot-through" from $V_{IN}$ to ground.

Excessive deadtime may cause degradation in converter efficiency due to current flowing through parasitic elements instead of the power devices. Progressively better efficiency is achieved as the deadtime approaches zero without ever causing shoot-through. The power FET ON/OFF detector circuit 211 monitors actual ON/OFF state transitions of the power devices $M1_{HS} \ldots Mm_{HS}$ and $M1_{LS} \ldots Mn_{LS}$ and generates corresponding control signals back to the deadtime circuit 112 within the control circuitry 210, thereby enabling the deadtime circuit 112 to adaptively adjust the amount of deadtime between high-side and low-side PWM signals. The power FET ON/OFF detector circuit 211 may be implemented in a number of ways, including by adapting the teachings of U.S. Pat. No. 11,057,023 B1, issued Jul. 6, 2021, entitled "Accurate High-Voltage Gate Detector", which is assigned to the assignee of the present invention, and the contents of which are incorporated by reference.

The control signal output by the FET ON/OFF detector circuit 211 may be used in a number of ways within the deadtime circuit 112 to adjust the deadtime between when the power devices are turned ON. For example, the deadtime circuit 112 may include a delay-locked loop (DLL). A DLL may be used to align the timing of the control signals into the high-side signal path and the low-side signal path so as to achieve the desired deadtime. The DLL compares the timing relationships (phase relationships, to be more precise) between the high-side signal path and the low-side signal path indicated by the control signals output by the FET ON/OFF detector circuit 211, and adjusts the delays of the PWM control signals sent along the high-side and low-side signal paths so that the respective PWM control signals are phase aligned. When the high-side and low-side PWM control signals are phase aligned, there is close to zero deadtime. There are also timing offsets (or phase offsets) that can be introduced into the comparison so that the DLL locks the phase not to 0 ns, but to some finite time (e.g., 2 ns), which would make the deadtime the same duration (e.g., 2 ns). The FET ON/OFF detector circuit 211 and the deadtime circuit 112 thus form a closed-loop adaptive deadtime circuit with variable deadtime delay.

A power device segment comprises at least one power device $M1_{HS} \ldots Mm_{HS}$, $M1_{LS} \ldots Mn_{LS}$. There is a respective driver and level shifter for each power device segment to independently enable or disable the associated power segment. In the illustrated example, there are m high-side power device segments and n low-side power device segments. In some embodiments, the power device or devices within a power device segment may include multiple smaller power devices each constructed as a unit cell. For example, 10,000 high-side power device unit cells may be organized as 2 power device segments having 5,000 unit cells each, or 5 power device segments having 2,000 unit power devices cells each, or 10 power device segments having 1,000 unit cells each. Further, power device segments need not all have the same number of unit cells. For example, 10,000 high-side power device unit cells may be organized as 2 power device segments having 4,000 unit cells each and 1 power device segment having 2,000 unit cells. In addition, the size of the unit cells need not be uniform. Thus, in some embodiments, the unit cells of some power device segments may be larger than the unit cells of other power device segments. Further, some unit cells within a power device segment may be larger than other unit cells within the same power device segment.

In the illustrated example, one way of enabling or disabling a power device segment is by means of a respective Enable signal, $Enable1_{HS} \ldots Enablem_{HS}$ and $Enablem_{LS} \ldots Enablen_{LS}$, applied to the level shifters 208-1 ... 208-m and 209-1 ... 209-n. When an Enable signal applied to a level shifter is in a first state (e.g., a logic "0"), control signals from the control circuitry 210 are ignored, and the level shifter and its associated driver may keep the associated power device segment in a pre-determined state, such as disabled state. Conversely, when an Enable signal applied to a level shifter is in a second state (e.g., a logic "1"), control signals from the control circuitry 210 are allowed to be applied to that level shifter. As one example, an AND gate (not shown) within each level shifter may suffice to implement enabling or disabling a power device segment as a function of the associated Enable signal and control signals from the control circuitry 210. It should also be clear that enabling or disabling a power device segment may also be achieved by applying a respective Enable signal at other nodes within the power device segment or the voltage supply for that power device segment.

The illustrated power converter 200 allows for adaptively sizing the half-bridge power stage 202 dependent on power requirements from the load. For example, at low loads, only one or a few power device segments may be enabled. As the load increases, additional power device segments may be enabled, until finally all power device segments are enabled. The number of power device segments enabled or disabled at any one time may be dynamically determined as a function of one or more measurements and/or control signals. For example, one such measurement may be a load measurement. A load measurement may be determined, for example, by a current sensing controller 212 that generates the signals $Enable1_{HS} \ldots Enablem_{HS}$ and $Enable1_{LS} \ldots Enablen_{LS}$. As another example, voltage and/or current measurements may be taken at various nodes within or after the half-bridge power stage 202 to control the power device segments enabled or disabled at any one time in light of load requirements, over or under voltage conditions, and/or over or under current conditions. In addition, the number of enable power device segments may be set programmatically from an external source (e.g., a controller for a system to which the power converter 200 is connected).

Figure 2B:
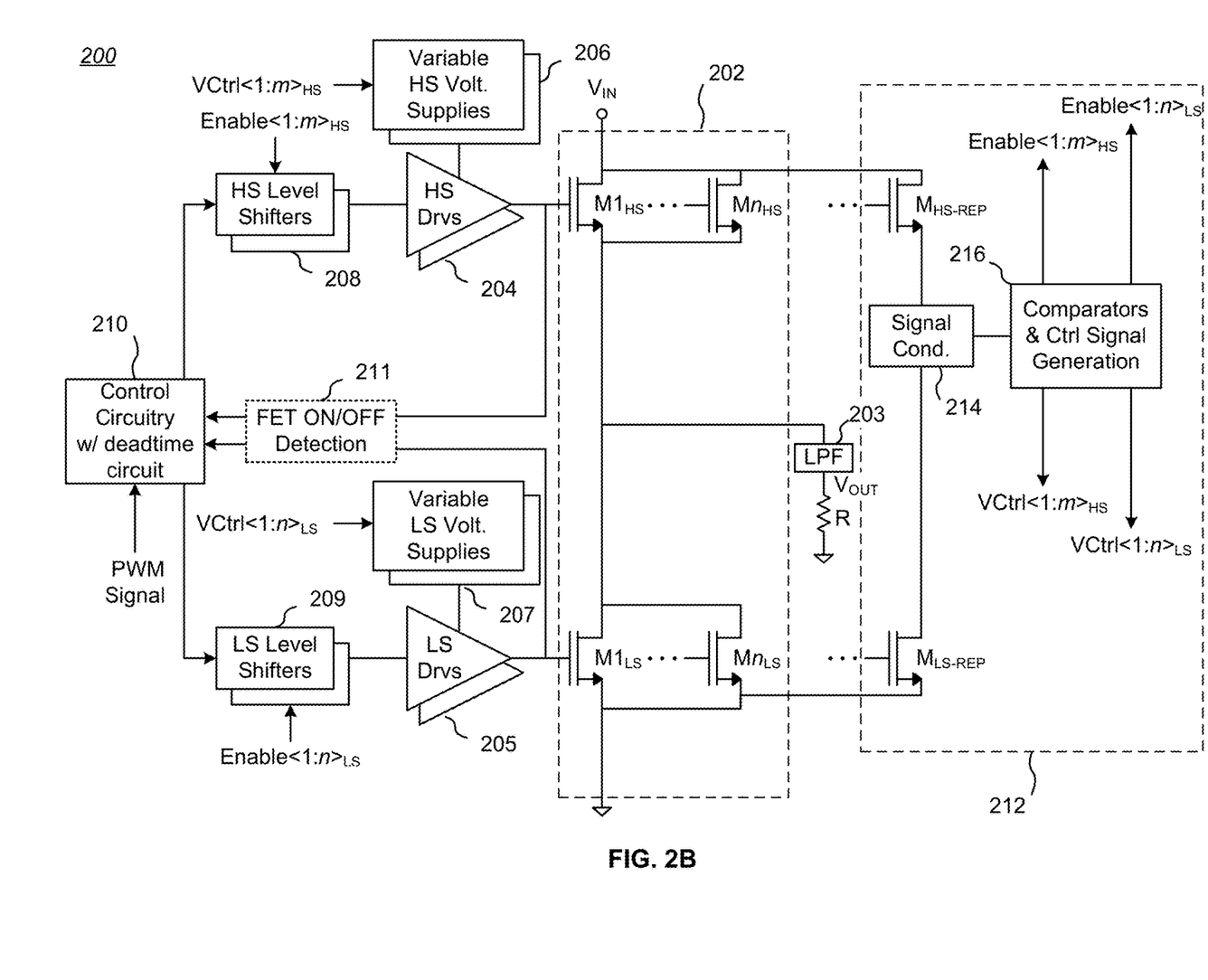
FIG. 2B is a simplified block diagram of the buck power converter of FIG. 2A, showing details of one embodiment of a current sensing controller.

The power requirements of the power converter load can be sensed using various sensor circuits and methods. For example, FIG. 2B is a simplified block diagram of the buck power converter of FIG. 2A, showing details of one embodiment of a current sensing controller 212. In this example, a replica high-side segment comprises a replica device $M_{HS\text{-}REP}$ (e.g., a MOSFET) having essentially the same electrical characteristics as the high-side power devices but generally scaled down in size (e.g., ¹⁄₁₀,₀₀₀). Similarly, a replica low-side segment comprises a replica device MLS-REP having the same electrical characteristics as the low-side power devices but scaled down in size. In a form of current sensing using replica devices, the sensor replica devices $M_{HS\text{-}REP}$, $M_{LS\text{-}REP}$ each pass a scaled current that is proportional to the respective high-side and low-side momentary currents. The scaled replica currents are applied to a signal conditioner 214, which may comprise, among other circuits, a current-to-voltage circuit that generates an output voltage signal proportional to the current input, or an analog-to-digital converter that generics a numeric value based on the input from the scaled replica sensor.

Other circuits and methods may be used to sense the level of load current for the power converter 200. For example, a sense resistor (not shown) placed in series with the current path of the power converter 200 (e.g., just before or after the inductor L) in conjunction with a signal conditioner 214 (e.g., a voltage measurement circuit) coupled across the sense resistor may be used to measure load current based on Ohm's law, I=V/R. As another example, inductor DC resistance current sensing uses the parasitic resistance of the inductor L winding to measure current, thereby eliminating the sense resistor. A resistor R1 and capacitor C1 (not shown) coupled in series may be placed in parallel with the series inductance and parasitic resistance of the inductor L, and a signal conditioner 214 (e.g., a voltage measurement circuit) coupled across the capacitor C1 may be used to measure load current.

A sensor circuit output corresponding to load current (e.g., the output of the signal conditioner 214 shown in FIG. 2B) may be coupled to a comparator and control signal generation circuit 216. The comparator and control signal generation circuit 216 may be configured to compare a voltage indicative of load current to respective high-side and low-side reference voltages and generate at least the signals Enable1$_{HS}$ . . . Enablem$_{HS}$ and Enable1$_{LS}$ . . . Enablen$_{LS}$. In alternative embodiments, the input from the signal conditioner 214 may be forms of analog signals, such as current, charge, time-based signals, etc. In yet other alternative embodiments, the input from the signal conditioner 214 may be (or may be converted to) a numeric value and the numeric value compared to one or more numeric reference values.

Whether analog or digital comparisons are made, the comparison may be a simple threshold comparison in which less than all power device segments are enabled if the corresponding scaled replica current is below a reference level, and all power device segments are enabled if the corresponding scaled replica current is above the reference level. Multiple thresholds may be used to provide finer degrees of power device segment enablement/disablement, from "low-medium-high" numbers of enabled power device segments to use of a lookup table to enable or disable any number m and/or n of the power device segments based on load conditions.

The load current at which power device segments are enabled/disabled may be based on power loss calculations and/or empirical measurements intended to convey power to the load R so as to optimize the efficiency of the power converter throughout its power range. Adaptive sizing of the power converter 200 allows for better optimization of conduction losses and switching losses across its power range.

Adaptive Gate Drive

Switching power converters, especially high-power converters (e.g., over about 20 amps), usually must provide a large range of power to a load. Throughout this power range, the power loss mechanism in the power converter generally will change from switching power losses that are dominant at light load conditions to conduction losses that are dominant at high load conditions. The power loss mechanisms in the power devices typically are affected by the ON resistance, $R_{ON}$, of the power devices (e.g., M1$_{HS}$ . . . Mm$_{HS}$ and M1$_{LS}$ . . . Mn$_{LS}$ in FIGS. 2A and 2B) and the gate charge of the power devices, $Q_G$, which is the charge required on the gate before a MOSFET begins to turn ON fully. The $R_{ON}$ value affects conduction losses while the $Q_G$ value affects switching losses.

MOSFETs may be characterized based on a figure of merit equal to the product of $R_{ON} \times Q_G$ that accounts for both conduction losses and switching losses. A power converter can be operated at peak efficiency when its MOSFET power devices are operated at their lowest $R_{ON} \times Q_G$ figure of merit. Accordingly, conventionally, power converters use a single fixed gate drive voltage to drive the power devices, which sets constant values for $R_{ON}$ and $Q_G$ that produce the lowest $R_{ON} \times Q_G$ product throughout the power range supplied to the load.

However, a fixed gate drive to a power device of a power converter limits the ability to impact the dominant sources of power loss within the power device. Therefore, the efficiency of the power converter is often fixed by the sizing of the power devices used for the application and the constant drive voltage applied to the power devices.

Embodiments of the present invention recognize that the gate drive level of the power devices in a power converter can be varied to beneficially optimize for $R_{ON}$, $Q_G$, and $R_{ON} \times Q_G$ depending on load requirements. For example, the gate drive voltage at which the lowest $R_{ON}$ is achieved—thus minimizing conduction losses—is different (and usually higher) than the gate drive voltage that achieves the lowest $R_{ON} \times Q_G$ product or the lowest $Q_G$. As another example, the gate drive voltage at which the lowest $Q_G$ is achieved—thus minimizing switching losses—is different (and usually lower) than the gate drive voltage that achieves the lowest $R_{ON} \times Q_G$ product or $R_{ON}$.

Accordingly, embodiments of the present invention provide for an adaptive gate drive scheme based on power requirements of the load. For high power levels, the drive voltage to the power devices may be regulated so that the power devices operate at their lowest $R_{ON}$ for reduced conduction losses. For mid-to-light (intermediate) loads, it may be more advantageous for the drive voltage to the power devices to be regulated so that the power devices operate at their lowest $R_{ON} \times Q_G$ figure of merit for higher efficiency. For light-loads, it may be more advantageous for the drive voltage to the power devices to be regulated so that the power devices operate at their lowest $Q_G$ for reduced switching power.

FIG. 2B show variable voltage supplies 206 and 207 (corresponding to 206-1 . . . 206-$m$ and 207-1 . . . 207-$n$ in FIG. 2A) coupled to respective high-side drivers 204 (corresponding to 204-1 . . . 204-$m$ in FIG. 2A) and low-side drivers 205 (corresponding to 205-1 . . . 205-$n$ in FIG. 2A). The variable voltage supplies for the drivers allows optimization of $R_{ON}$ and $Q_G$. The variable voltage supplies 206, 207 are configured to provide at least two different voltage levels to the respective drivers 204, 205 as a function of load current for the power converter 200. In some embodiments, the variable voltage supplies 206, 207 provide three different voltage levels corresponding to optimized lowest values for $R_{ON}$, $R_{ON} \times Q_G$, and $Q_G$, respectively. In some embodiments, the variable voltage supplies 206, 207 provide more than three different voltage levels corresponding to a range of values for $R_{ON}$, $R_{ON} \times Q_G$, and $Q_G$, respectively, for finer control of conduction losses versus switching losses.

For example, the driver voltage to a power device may be set relatively high to over-drive the MOSFET gate, thereby lowering $R_{ON}$ to a desired level that allows high current flow and thus lowers conduction loss. Conversely, the driver voltage to a power device may be set relatively low to drive the MOSFET gate, thereby lowering $Q_G$ to a desired level and thus lowering switching losses.

The variable voltage supplies 206 and 207 may be implemented in a variety of circuits. For example, U.S. patent application Ser. No. 17/331,594, filed May 26, 2021, entitled "Dynamic Di-vision Ratio Charge Pump Switching", assigned to the assignee of the present invention and hereby incorporated by reference, discloses a variable voltage circuit configured to supply a gate driver with at least two different voltage levels to be coupled through to the gate of a MOSFET. Other circuits known in the art can perform the function of the variable voltage supplies 206, 207, which is to provide an output voltage to a corresponding driver 204, 207 that is a function of load current.

The current sensing controller 212 of FIGS. 2A and 2B may be adapted to output respective high-side voltage control signals VCtrl<1-m>$_{HS}$ and low-side voltage control signals VCtrl<1-n>$_{LS}$ to the variable voltage supplies 206, 207 as a function of sensed load current. Any of the load current sensing circuits and methods described above with respect to FIGS. 2A and 2B, as well as other load current sensing circuits and methods, may be used to control the voltage output level of the variable voltage supplies 206, 207. The load current that sets the variable voltage supplies 206, 207 to a particular output voltage level may be based on power loss calculations and/or empirical measurements intended to convey power to the load R so as to optimize the overall efficiency of the power converter throughout its power range. The current sensing controller 212 may make, for example, a "low-medium-high" sensed load comparison that sets a relatively low drive voltage at low loads so that the power devices operate at their lowest $Q_G$ for reduced switching power, a moderate drive voltage at medium loads so that the power devices operate at their lowest $R_{ON} \times Q_G$ figure of merit for best overall efficiency, and a high drive voltage at high loads so that the power devices operate at their lowest $R_{ON}$ for reduced conduction losses.

In some embodiments, not all power device segments need be set to the same drive voltage levels. Thus, some power device segments may be optimized for $Q_G$, other power device segments may be optimized for $R_{ON} \times Q_G$, and still other power device segments may be optimized for $R_{ON}$. In some embodiments, a subset of power device segments may have a fixed voltage supply (for example, to optimize one of the parameters $R_{ON}$, $Q_G$, or $R_{ON} \times Q_G$), while other power device segments may utilize variable voltage supplies 206, 207 and adaptively optimize the $R_{ON}$, $Q_G$, or $R_{ON} \times Q_G$ parameters.

In general, use of power device segments provides a wide dynamic range of response to load current, while use of adaptive gate drive circuitry, while having less dynamic range, provides quite fine control over power converter efficiency. Improved efficiency results, for example, in less wasted heat and longer battery life, both of which are beneficial in many applications, such as cellular telephones and other battery-powered devices.

Figure 3:
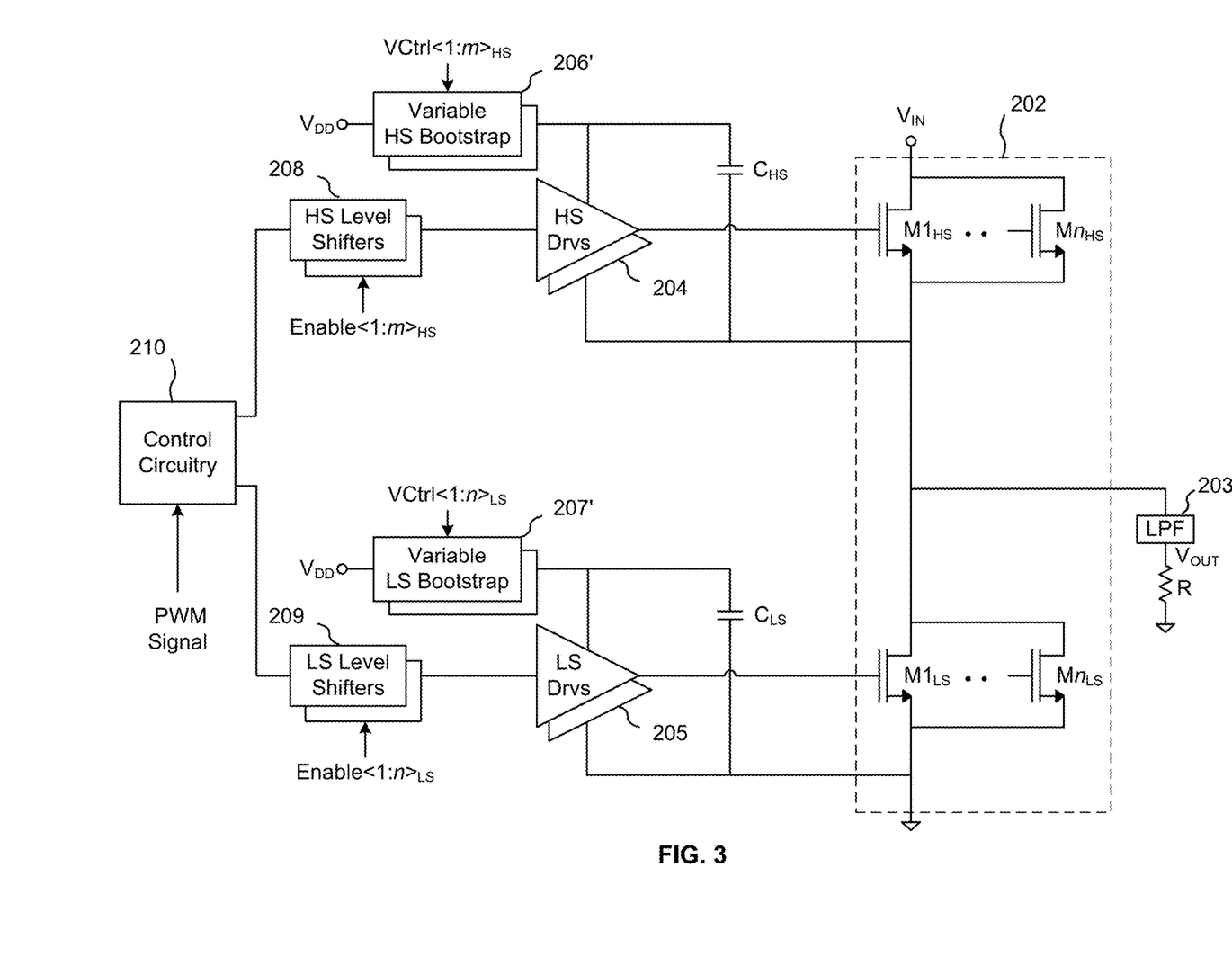
FIG. 3 is a block diagram of a second example of a buck power converter with power device segmentation and adaptive gate drive.

As noted above, the variable voltage supplies 206, 207 may be implemented in a variety of ways. FIG. 3 is a block diagram of a second example of a buck power converter with power device segmentation and adaptive gate drive (to avoid undue clutter, the current sensing controller 212 is omitted). In this example, the variable voltage supplies 206, 207 of FIGS. 2A and 2B are implemented as variable bootstrap circuits 206', 207'.

As is known in the art, N-type MOSFETs are often used as power devices in switching power converters because their lower $R_{ON}$ per given area improves efficiency per area. However, turning a high-side (i.e., coupled to $V_{IN}$) N-type MOSFET completely ON requires a gate voltage $V_G$ higher than the source voltage $V_S$, especially considering that the source voltage may reach $V_{IN}$ eventually as the MOSFET turns ON. Under this turn ON behavior, the gate voltage $V_G$ needs to be sufficiently higher than $V_{IN}$ for the MOSFET to fully convey the $V_{IN}$ from its drain terminal to its source terminal with minimal voltage drop across its drain-to-source channel so as to keep power loss through the MOSFET to an optimal value. To generate this high $V_G$ voltage for a power device referenced to its source voltage, where the source voltage may eventually reach at or near $V_{IN}$, a "flying" (variable, non-zero) supply voltage referenced to the MOSFET's source terminal is generally required. This "flying" voltage supply, which is a floating supply voltage where the ground reference of the supply may transition rapidly between a lower voltage and a higher voltage, provides the sufficient gate-to-source voltage $V_{GS}$ to achieve the required low $R_{ON}$, low $R_{ON} \times Q_G$ product, or low $Q_G$ that is required for optimal efficiency for a current set of operational conditions. A bootstrap circuit is commonly used to provide this "flying" power supply that is used by the drivers 204 to drive the gate of the MOSFETs M1$_{HS}$ ... Mm$_{HS}$. Otherwise, a more complex voltage supply (e.g., a separate linear power supply) must be provided to power the drivers 204, 207.

In FIG. 3, a high-side variable bootstrap circuit 206' is coupled to a respective high-side driver 204. A high-side bootstrap capacitor $C_{HS}$ is coupled between the output of the high-side variable bootstrap circuit 206' and the source of a corresponding power device. Internally, the high-side variable bootstrap circuit 206' may include a diode, switch and/or other circuit elements coupled to a supply voltage $V_{DD}$. The high-side variable bootstrap circuit 206' is configured to charge the high-side bootstrap capacitor $C_{HS}$ to a variable and selectable gate drive voltage (up to and including $V_{DD}$) with respect to the source terminal of the corresponding power device when the corresponding power device is OFF. The high-side variable bootstrap circuit 206' provides a suitable voltage to the coupled driver 204 in order to generate a sufficiently high $V_{GS}$ voltage for the gate-to-source of the associated power device.

In conventional switching power converter designs, a bootstrap circuit for the low-side power devices is generally not needed as the power devices are referenced to ground. However, in embodiments of the present invention, a low-side variable bootstrap circuit 207' and optional low-side bootstrap capacitor $C_{LS}$ are coupled to a respective low-side driver 205 in order to provide a variable and selectable gate drive voltage (up to and including $V_{DD}$) for a corresponding low-side power device and thereby optimize efficiency for a particular power range. Note the that the high-side bootstrap capacitor $C_{HS}$ and the low-side bootstrap capacitor $C_{LS}$ need not be the same size.

Examples of bootstrap circuits that may be adapted for use in embodiments of the present invention are set forth in U.S. patent application Ser. No. 63/214,450, filed Jun. 24, 2021, entitled "Efficient Bootstrap Supply Generators for Multi-Level Power Converters", assigned to the assignee of the present invention and hereby incorporated by reference.

To implement an adjustable gate drive, the output voltage of each variable bootstrap circuit 206', 207' is selectable by a corresponding voltage control signal VCtrl<1-m>$_{HS}$, VCtrl<1-n>$_{LS}$. The supply voltage to the drivers 204, 205—and thus the gate drive voltage of the drivers to the power devices—may be varied in a fine analog fashion or varied in discrete steps, depending on the needs of a particular application.

Circuit Embodiments

For purposes of example only, the switching power converters of FIGS. 2A, 2B, and 3 have been shown in simplest form. However, the teachings of the present application apply to multi-level switching power converters, such as those shown in U.S. Patent Application No. 63/214,450 referenced above, and to charge pumps. Further, although the present examples show a half-bridge buck power stage, the teachings of the present application apply to other types of power converter topologies, including boost and buck-boost topologies.

Figure 4:
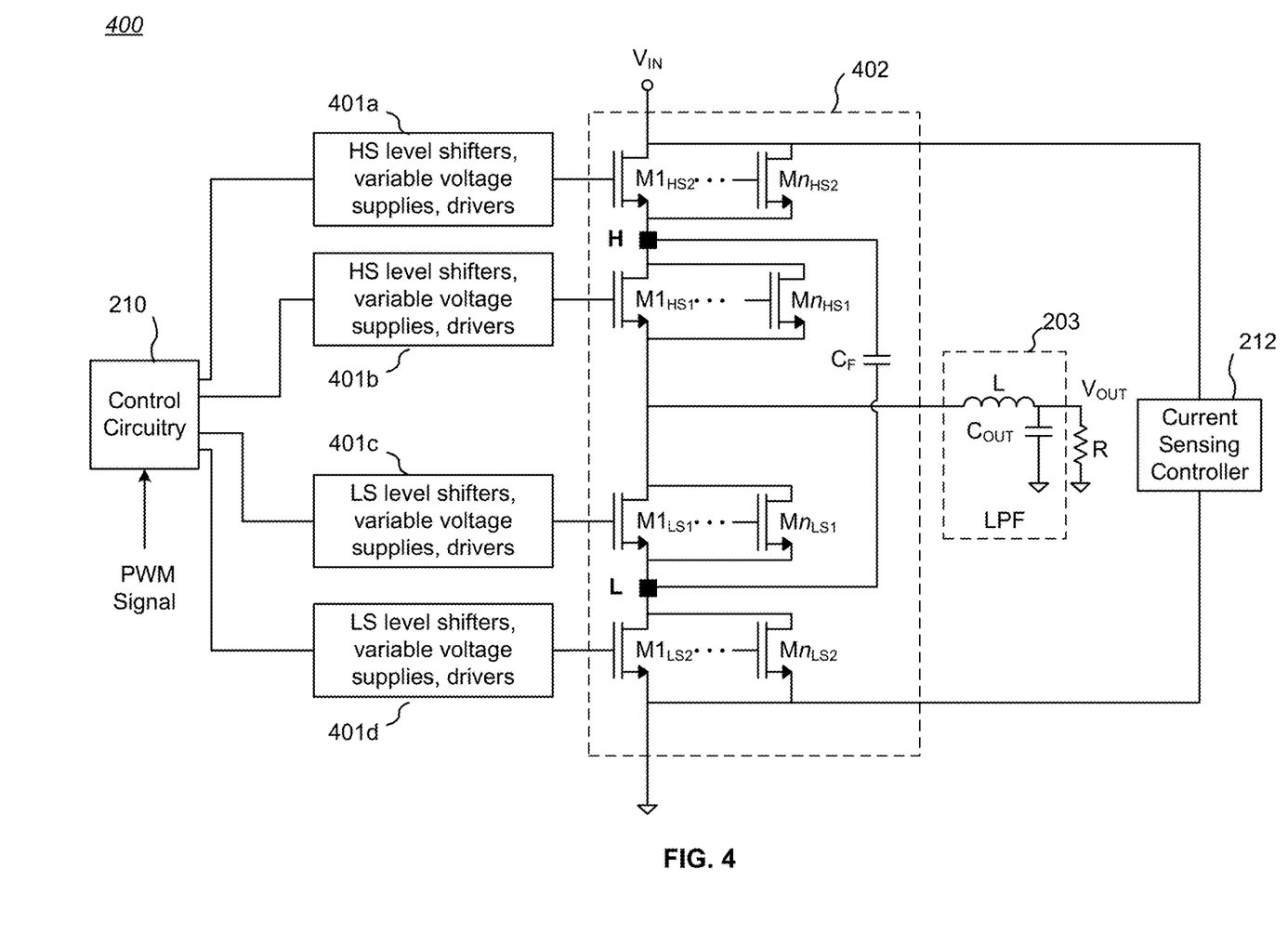
FIG. 4 is a block diagram of an example of a multi-level switching power converter with power device segmentation and adaptive gate drive.

For example, FIG. 4 is a block diagram of an example of a multi-level switching power converter 400 with power device segmentation and adaptive gate drive. Similar in most respects to the circuit of FIG. 3 (but representing the respective levels shifters, variable voltage supplies, and drivers as single blocks 401a-401d), the illustrated example replaces the half-bridge power stage 202 of FIG. 3 with a 3-level multi-level switching power converter stage 402. A node H between two sets of high-side switches $M1_{HS1}$ ... $Mn_{HS1}$ and $M1_{HS2}$ ... $Mn_{HS2}$ is coupled by a "fly" capacitor $C_F$ to a node L between two sets of low-side switches $M1_{LS1}$ ... $Mn_{LS1}$ and $M1_{LS2}$ ... $Mn_{LS2}$. In other embodiments, additional sets of similar high-side and low-side switch sets coupled by additional fly capacitors may be included to implement a 4-level or higher level switching power converter stage 402. Each additional set x of switches is preferably driven by a corresponding block 401x.

As is known in the art, the power converter stage 402 high-side switches $M1_{HS1}$ ... $Mn_{HS1}$ and $M1_{HS2}$ ... $Mn_{HS2}$ and low-side switches $M1_{LS1}$ ... $Mn_{LS1}$ and $M1_{LS2}$ ... $Mn_{LS2}$ switch between multiple states, each of which defines one of several different voltages presented to the inductor L coupled to the output capacitor $C_{OUT}$ and the load R. The illustrated multi-level DC-to-DC converter may be configured as a buck only converter, as a boost only converter, or as a buck-boost converter, and may be inverting or non-inverting.

Figure 5:
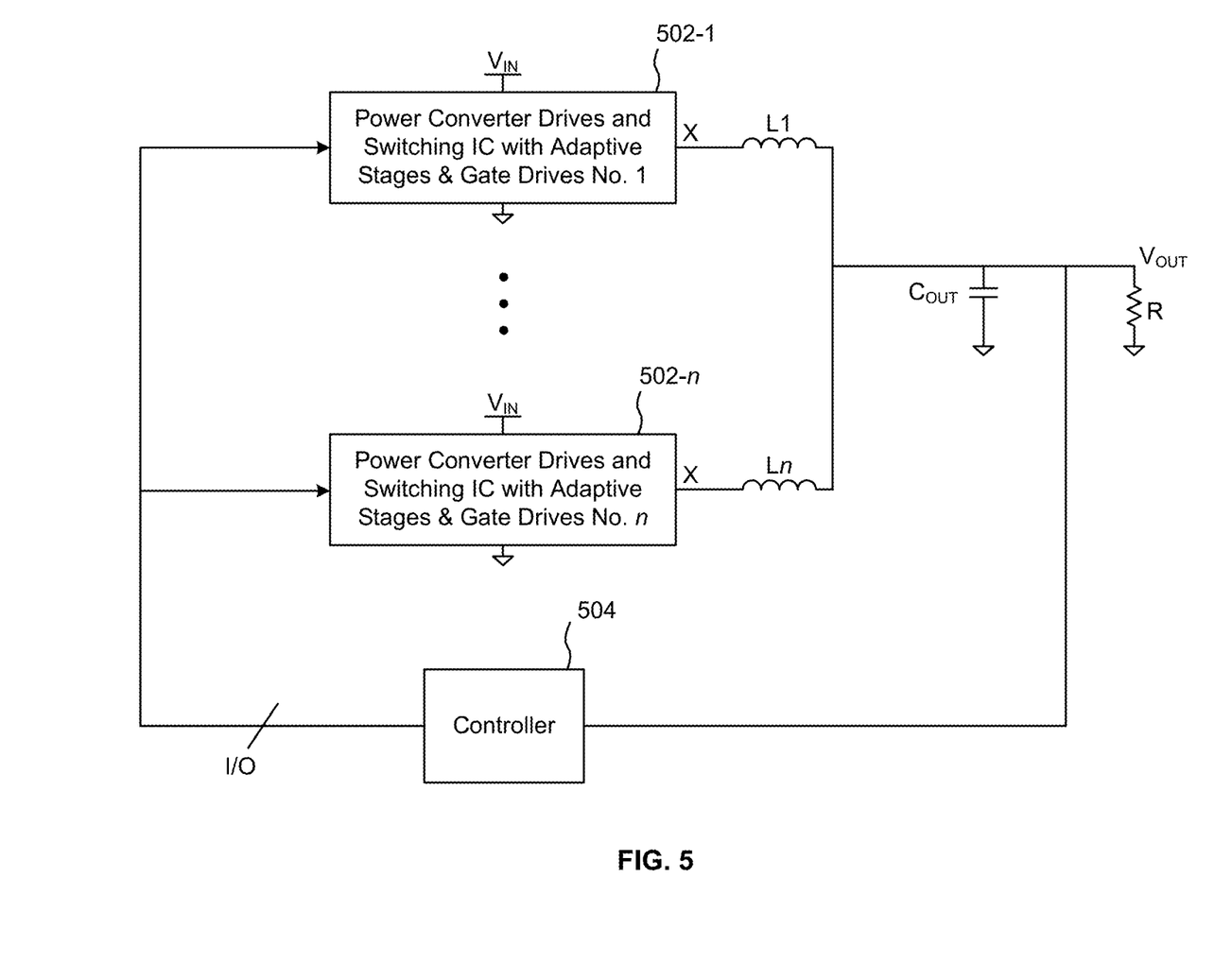
FIG. 5 is a block diagram of n parallel-coupled power converter drive and switching ICs with adaptive stages and gate drives.

The teachings of the present application also apply to a power converter architecture comprising multiple power converters or power stages coupled in parallel, sometimes called a multi-phase architecture (for purposes of this disclosure, parallel power converters and parallel power stages may both be considered to be a multi-phase architecture). For example, FIG. 5 is a block diagram of n parallel-coupled power converter drive and switching ICs with adaptive stages and gate drives 502-1 ... 502-n. The outputs of the ICs 502-1 ... 502-n are coupled to respective inductors L1 ... Ln, which in turn are coupled to a common output capacitor $C_{OUT}$. The output capacitor $C_{OUT}$ may be coupled to a load (represented as a resistor R in this example). In the illustrated example, a controller 504 is coupled to the output $V_{OUT}$ of the parallel ICs 502-1 ... 502-n, and in turn the controller 504 is coupled by input/output (I/O) control lines to the parallel ICs 502-1 ... 502-n to regulate the operation of the power converter drive and switching ICs in general and in accordance with the teachings of this disclosure.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, servers and datacenters, industrial devices, etc.

It may be particularly beneficial to fabricate embodiments of the circuitry shown in FIG. 2A, 2B, 3, or 4—but without the output LPF 203 or any other inductors or capacitors (which tend to be large components and which are often sized for a particular application) or the load R—as a power converter drive and switching integrated circuit for a switched-mode power supply (SMPS). In other embodiments, the LPF 203 or any other inductors or capacitors may be fabricated with the power converter drive and switching integrated circuit for a switched-mode power supply (SMPS).

Figure 6A:
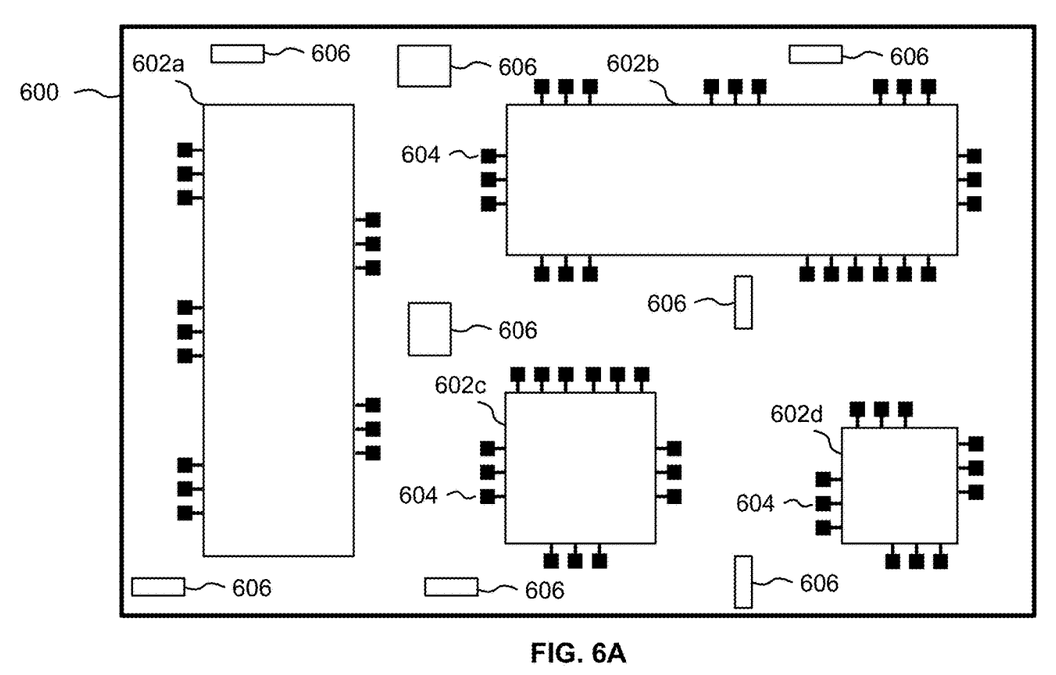
FIG. 6A is a top plan view of a substrate that may be, for example, a printed circuit board or chip module substrate (e.g., a thin-film tile).

As one example of further integration of embodiments of the present invention with other components, FIG. 6A is a top plan view of a substrate 600 that may be, for example, a printed circuit board or chip module substrate (e.g., a thin-film tile). In the illustrated example, the substrate 600 includes multiple ICs 602a-602d having terminal pads 604 which would be interconnected by conductive vias and/or traces on and/or within the substrate 600 or on the opposite (back) surface of the substrate 600 (to avoid clutter, the surface conductive traces are not shown and not all terminal pads are labelled). The ICs 602a-602d may embody, for example, other power converters, power devices, controllers, and other circuitry. For example, IC 602b may incorporate one or more instances of a switching power converter circuit like the circuits shown in FIGS. 2A, 2B, and 3.

The substrate 600 may also include one or more passive devices 606 embedded in, formed on, and/or affixed to the substrate 600. While shown as generic rectangles, the passive devices 606 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 600 to other passive devices 606 and/or the individual ICs 602a-602d.

Figure 6B:
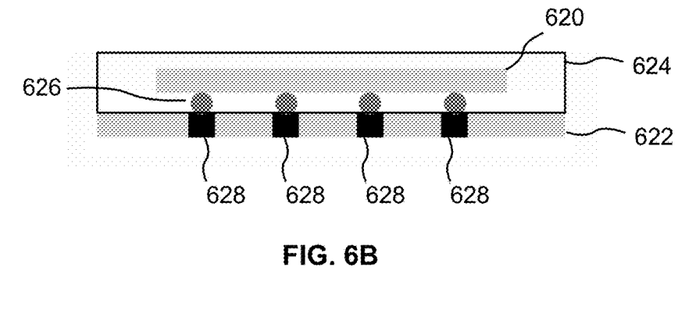
FIG. 6B is a cross-sectional view of a flip-chip IC die attached to a lead frame and embedded in encapsulation material.

Embodiments of the present invention lend themselves to a variety of packaging options. For example, FIG. 6B is a cross-sectional view of a flip-chip IC die 620 attached to a lead frame 622 and embedded in encapsulation material 624. The flip-chip IC die 620 may include, for example, an instance of a circuit embodying the present invention. As is known in the art, a flip-chip IC die 620 includes one or more solder bumps or copper pillars 626 configured to connect appropriate circuit elements on the circuit surface of the die to electrically-conductive connections 628 of a lead frame 622.

Methods

Figure 7:
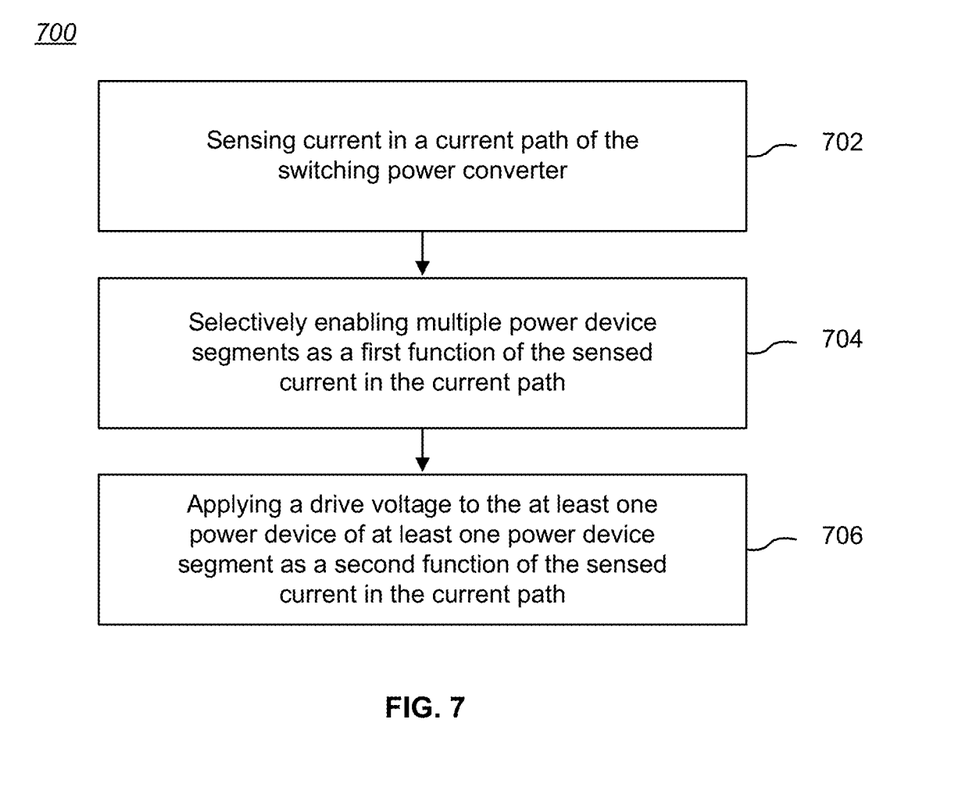
FIG. 7 is a process flow chart showing one method for controlling a switching power converter having at least three power device segments.

Another aspect of the invention includes methods for controlling a switching power converter having at least three power device segments. For example, FIG. 7 is a process flow chart 700 showing one method for controlling a switching power converter having at least three power device segments. Each power device segment includes at least one power device. Associated with each power device segment is a driver for one or more power devices within the power device segment, and, optionally, a level shifter, wherein the power devices of the power device segments are coupled and configured to convert an applied input voltage to a different output voltage. The method includes: sensing current in a current path of the switching power converter (Block 702); selectively enabling multiple power device segments as a first function of the sensed current in the current path (Block 704); and applying a drive voltage to the at least one power device of at least one power device segment as a second function of the sensed current in the current path (Block 706). More generally, the number of power device segments in a switching power converter that are enabled or disabled at any one time may be dynamically determined as a function of one or more measurements and/or control signals, while a drive voltage applied to at least one power device of at least one power device segment may be set as a function of one or more measurements and/or control signals.

Additional aspects of the above method may include one or more of the following: wherein more power device segments are enabled at higher values of sensed current compared to lower values of sensed current; wherein fewer power device segments are enabled at lower values of sensed current compared to higher values of sensed current; wherein the drive voltage is a higher voltage at higher values of sensed current compared to lower values of sensed current; wherein the drive voltage is a lower voltage at lower values of sensed current compared to higher values of sensed current; wherein the power devices are MOSFETs, and wherein the drive voltage is a voltage that lowers the ON resistance, $R_{ON}$, of the MOSFETS at higher values of sensed current; wherein the power devices are MOSFETs, and wherein the drive voltage is a voltage that minimizes an $R_{ON} \times Q_G$ figure of merit for the MOSFETS at intermediate values of sensed current; wherein the power devices are MOSFETs, and wherein the drive voltage is a voltage that lowers the gate charge, $Q_G$, of the MOSFETS at lower values of sensed current; wherein sensing current is by a current sensing controller that include at least one sensor device coupled to the current path of the switching power converter and configured to output a signal proportional to current in the current path, a signal conditioner coupled to the at least one sensor device and configured to convert the output of the at least one sensor device to a voltage, and a comparator and control signal generation circuit coupled to the signal conditioner and configured to compare the voltage from the signal conditioner to at least one corresponding reference voltage and (1) set the state of enablement/disablement control signals to the power device segments based on the comparison, and (2) select the voltage output level for multiple variable voltage supplies based on the comparison; wherein sensing current is by a current sensing controller that includes at least one sensor device coupled to the current path of the switching power converter and configured to output a signal proportional to current in the current path, a signal conditioner coupled to the at least one sensor device and configured to convert the output of the at least one sensor device to a numeric value, and a comparator and control signal generation circuit coupled to the signal conditioner and configured to compare the numeric value from the signal conditioner to at least one corresponding numeric reference value and (1) set the state of enablement/disablement control signals to the power device segments based on the comparison, and (2) select the voltage output level for multiple variable voltage supplies based on the comparison; wherein the at least one sensor device includes at least one replica device having essentially the same electrical characteristics as the power devices and configured to output a current proportional to the current in the current path; wherein the at least one sensor device includes a sense resistor configured to generate a voltage proportional to current through the sense resistor; wherein the at least one sensor device includes at least one inductor DC resistance (DCR) current sensing circuit configured to generate a voltage proportional to current through an output inductor of the switching power converter; and/or wherein the drive voltage is provided by at least one variable voltage supply that includes a variable bootstrap circuit having an output coupled to a respective driver and a bootstrap capacitor coupled between the output of the variable bootstrap circuit and a voltage derived from the applied input voltage.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

With respect to the figures referenced in this disclosure, the dimensions for the various elements are not to scale; some dimensions have been greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies, such as bipolar, BiCMOS, LDMOS, BCD (Bipolar-CMOS-DMOS), GaAs HBT, GaN HEMT, GaAs pHEMT, and MESFET technologies. However, embodiments of the invention are particularly useful when fabricated using BCD technologies, or when fabricated with processes having similar characteristics. Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A switching power converter, including:
   (a) a set of power device segments, each power device segment including at least one power device, wherein the power devices are coupled and configured to selectively convert an applied input voltage to a different output voltage;
   (b) a set of drivers, each driver respectively coupled to a control input of a corresponding power device within a corresponding power device segment;
   (c) a set of variable voltage supplies, each variable voltage supply coupled to a corresponding driver in the set of drivers and configured to power circuitry within the corresponding driver; and
   (d) a current sensing controller, coupled to a current path of the switching power converter and to the set of variable voltage supplies and configured to (1) selectively enable multiple power devices within the set of power device segments as a first function of a sensed current in the current path, and (2) select a voltage for each variable voltage supply as a second function of the sensed current in the current path, wherein the current sensing controller includes:
     (1) at least one sensor device coupled to the current path of the switching power converter and configured to output a signal proportional to current in the current path;
     (2) a signal conditioner coupled to the at least one sensor device and configured to convert the output of the at least one sensor device to an output signal comprising one of an analog signal or a numeric value; and
     (3) a comparator and control signal generation circuit coupled to the signal conditioner and configured to compare the output signal from the signal conditioner to at least one corresponding reference signal and (1) set the state of enablement/disablement control signals to the power device segments based on the comparison, and (2) select the voltage for each variable voltage supply based on the comparison.

2. The switching power converter of claim 1, further including a set of level shifters, each respectively coupled to a corresponding driver in the set of drivers.

3. The switching power converter of claim 1, wherein more power device segments are enabled at higher values of sensed current compared to lower values of sensed current.

4. The switching power converter of claim 1, wherein fewer power device segments are enabled at lower values of sensed current compared to higher values of sensed current.

5. The switching power converter of claim 1, wherein a variable voltage supply in the set of variable voltage supplies outputs a higher voltage at higher values of sensed current compared to lower values of sensed current.

6. The switching power converter of claim 1, wherein a variable voltage supply in the set of variable voltage supplies outputs a lower voltage at lower values of sensed current compared to higher values of sensed current.

7. The switching power converter of claim 1, wherein the power devices are MOSFETs, and wherein a variable voltage supply in the set of variable voltage supplies outputs a voltage to a corresponding MOSFET that lowers the ON resistance, $R_{ON}$, of the corresponding MOSFET at higher values of sensed current.

8. The switching power converter of claim 1, wherein the power devices are MOSFETs, and wherein a variable voltage supply in the set of variable voltage supplies outputs a voltage to a corresponding MOSFET that minimizes an $R_{ON} \times Q_G$ figure of merit for the corresponding MOSFET at intermediate values of sensed current.

9. The switching power converter of claim 1, wherein the power devices are MOSFETs, and wherein a variable voltage supply in the set of variable voltage supplies outputs a voltage to a corresponding MOSFET that lowers the gate charge, $Q_G$, of the corresponding MOSFET at lower values of sensed current.

10. The switching power converter of claim 1, wherein the at least one sensor device includes at least one replica device having essentially the same electrical characteristics as the power devices and configured to output a current proportional to the current in the current path.

11. The switching power converter of claim 1, wherein the at least one sensor device includes a sense resistor configured to generate a voltage proportional to current through the sense resistor.

12. The switching power converter of claim 1, wherein the at least one sensor device includes at least one inductor DC resistance current sensing circuit configured to generate a voltage proportional to current through an output inductor of the switching power converter.

13. The switching power converter of claim 1, wherein at least one variable voltage supply includes a variable bootstrap circuit having an output coupled to a respective driver and a bootstrap capacitor coupled between the output of the variable bootstrap circuit and a voltage derived from the applied input voltage.

14. The switching power converter of claim 1, wherein the power device segments are configured as a multi-level switching power converter stage.

15. The switching power converter of claim 1, wherein the switching power converter is fabricated as an integrated circuit.

16. The switching power converter of claim 1, wherein at least two drivers within the set of drivers are controlled by respective pulse-width modulation (PWM) signals, and further including an adaptive deadtime circuit coupled to the outputs of the at least two drivers and configured to detect ON/OFF state transitions of the respective power device and to adaptively adjust an amount of deadtime between the PWM signals.

* * * * *